May 16, 1967  R. J. ROGENSKI  3,319,939
ROTATABLE BEATER ASSEMBLY
Filed Oct. 21, 1965

INVENTOR
RAYMOND J. ROGENSKI

United States Patent Office 3,319,939
Patented May 16, 1967

3,319,939
ROTATABLE BEATER ASSEMBLY
Raymond J. Rogenski, Torrington, Conn., assignor to Dynamics Corporation of America, New York, N.Y., a corporation of New York
Filed Oct. 21, 1965, Ser. No. 499,793
7 Claims. (Cl. 259—134)

This invention relates generally to improvements in rotatable beaters and is concerned more particularly with a disc beater and wire beater attachment including novel means for attaching the same to a beater shaft.

It is particularly desirable in any beater assembly to provide a means for attaching a beater to the shaft which is relatively inexpensive to manufacture and which may be easily replaced. Additionally, it is sometimes desirable to provide a means for attaching to the beater shaft a plurality of beaters which provide differing but complementary beater functions.

Accordingly, an object of this invention is to provide simple and inexpensive means for detachably securing a beater to a rotatable shaft.

A further object of this invention is to provide a means for attaching a plurality of beaters of differing functions to a single rotatable shaft.

These and other objects will become apparent from the following description when taken in conjunction with the drawings wherein a preferred embodiment of the principles of the invention has been selected for exemplification.

Figure 1:
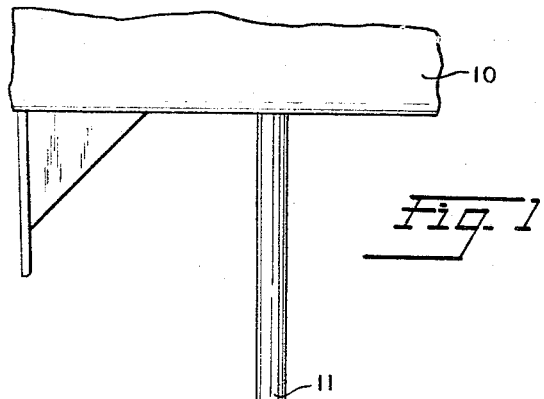
FIG. 1 is a side view of an electric motor shaft and beater attachment of the present invention.

Turning now more specifically to the drawings, FIG. 1 shows a motor housing 10 in fragment from which a shaft 11 extends downwardly so as to accomodate a beater at the outer end thereof. A disc beater 13 is secured to a semi-rigid hub member 15 which in turn is removably secured to the shaft 11 in a manner which will be explained in detail in connection with FIGS. 3, 4 and 5. Also illustrated is a wire beater 17 having a generally U-shaped form with extensions 19 and 21 inserted within the hub member 15 and held firmly against the shaft 11. Additionally, the outer legs of the U-shaped member have indentations 23 and 25 which resiliently fit within the notches 30 and 32 of the disc beater 13.

Figure 2:
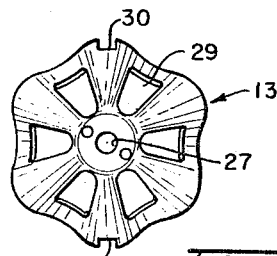
FIG. 2 is a plan view of the disc beater illustrated in FIG. 1.

FIG. 2 shows that the disc beater 13 has an undulate surface with elongated apertures 29 therethrough an a central aperture 27. The notches 30 and 32 are diametrically opposed at the outer periphery of the disc beater 13.

Figure 3:
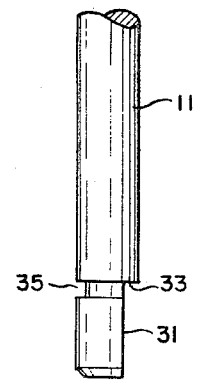
FIG. 3 is an enlarged partial side view of the rotatable shaft.

FIG. 3 illustrates the details of shaft 11 wherein the outer end of the shaft terminates in a substantially flat or offset face 31 which is parallel to and offset from the axis of the shaft 11. The face 31 meets the main shaft 11 so as to form a shoulder 33. A groove 35 is formed in the shaft adjacent to the shoulder member 33 and extends circumferentially about the shaft and terminates at the face 31.

Figure 4:
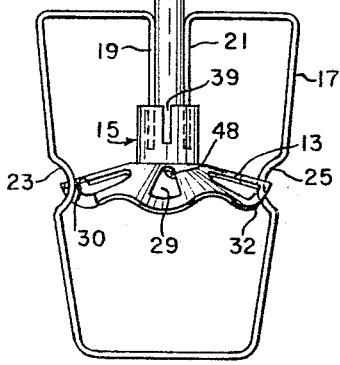
FIG. 4 is an enlarged plan view of the semi-rigid hub member attaching means.
Figure 5:
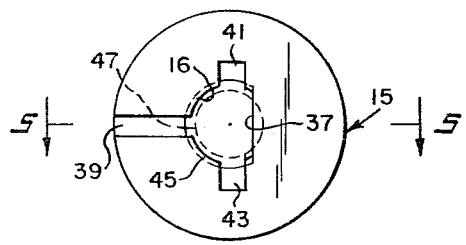
FIG. 5 is a sectional view taken along the lines 5—5 of FIG. 4.

FIGS. 4 and 5 illustrate the resilient hub member 15 and central recess 16 which is preferably of a material such as polypropylene or the like. One end of the hub 15 terminates in a reduced axial extension 47 which is adapted to fit within the aperture 27 of the disc beater 13. Extension 47 is forced into the aperture 27 and the beater 13 and the hub member 15 are securely held together as a unit in any convenient manner such as by screws 48 inserted upwardly from the underface of the beater into the body of the hub member.

The interior of the hub is formed so as to provide a central female part 16 substantially matching the outer end of the shaft 11 as shown in FIG. 3. The hub has a flat interior face 37 which meets with the flat face 31 of the shaft, and a lip 45 which matches the groove 35 of the shaft. In order to provide the desired flexibility for fitting the hub on the shaft, a slit 39 is provided in the hub wall opposite the flat face 37.

Additionally, in order to provide a means for retaining the legs 19 and 21 of the wire beater 17, the interior of the hub 15 may be slotted at opposite sides such as shown at 41 and 43. These slots extend downwardly into the hub the desired depth so that the legs 19 and 21, when inserted to their maximum depth, will automatically adjust the indentations 23 and 25 of the resilient wire beater so as to match the notches 30 and 32 of the disc beater. The combined effect of the hub and the notches in the disc beater prevents any relative rotation between the shaft, the disc beater and the wire beater.

It will be obvious that the assembly described above and shown in the drawings provides a simple but economic means for attaching the beaters to the shaft. There is also the important readily detachable or snap-out feature for quick cleaning of the blade assembly. When the disc beater and hub are fitted on the shaft, the matching faces 31 and 37 prevent any relative rotation of the beater and the shaft and the matching lip and groove prevent the beater from moving axially relative to the shaft. It is then a simple matter to insert the wire beater for providing the final assembly.

The motor housing 10 and shaft 11 may be as illustrated and described in my copending application entitled, Beverage Mixer, filed concurrently herewith and the present beater assembly is particularly adapted for this purpose. However, it is to be understood that the present beater assembly is also adapted for use with other types of mixers and there is no limitation upon its various uses.

The disc beater 13 alone has been found to be satisfactory for most liquid or beverage mixing purposes, milk shakes for example, and the wire beater 17 is particularly useful for such functions as beating egg whites and whipping cream.

It is also to be understood that the present invention is not confined to the precise construction and arrangement of parts as herein illustrated and described but embraces all such modifications thereof as are within the scope of the following claims.

I claim:
1. A rotatble beater device comprising,
   a shaft,
   a flat face at one end of said shaft, said face being substantially parallel to and offset from the axis of said shaft,
   said face terminating so as to form a shoulder on said shaft,
   a groove about said shaft adjacent to said shoulder and terminating at said face,
   a semi-rigid hub,
   said hub being formed so as to have a central recess substantaily matching the end of said shaft having said flat face, said hub abutting against said shoulder,
   an inner lip in said hub substantially mating with said groove,
   a slot in the wall of said hub,
   and a beater blade secured to said hub.

2. The device of claim 1 further comprising a U-shaped wire beater extending about said beater blade, the outer ends of said wire beater being bent so as to extend into said hub adjacent said shaft whereby said hub retains said wire beater in place.

3. The apparatus of claim 2 wherein said beater blade has a disc shape with diametrically opposed notches therein, the legs of said wire beater being resiliently retained within said notches.

4. A rotatable beater device comprising,
a shaft terminating at one end thereof in an offset face, said face being substantially parallel to the axis of said shaft,
said shaft forming a shoulder adjacent to said face,
a groove in said shaft adjacent said shoulder and terminating at said face,
a semi-rigid hub having a central recess substantially mating with said one end of said shaft,
a beater, and
means for securing said beater to said hub.

5. The device of claim 4 wherein said beater comprises a rigid disc having an undulate face and a plurality of elongated slots in said face.

6. The device of claim 5 further comprising a U-shaped wire beater extending about said rigid disc,
said wire beater terminating in a pair of legs adjacent said shaft and extending into said hub.

7. The apparatus of claim 6 wherein said disc has diametrically opposed peripheral slots and said wire beater resiliently fits into said slots.

References Cited by the Examiner

UNITED STATES PATENTS

| | | | |
|---|---|---|---|
| 900,441 | 10/1908 | Sprout | 259—144 |
| 1,949,047 | 2/1934 | Hill | 259—135 |

FOREIGN PATENTS 1,009,004   2/1952   France.

WILLIAM I. PRICE, *Primary Examiner.*